United States Patent [19]

Rahn et al.

[11] Patent Number: 4,787,598
[45] Date of Patent: Nov. 29, 1988

[54] APPARATUS FOR THE CONTINUOUS PRODUCTION OF PIPES WITH CROSS-PROFILED WALLS

[75] Inventors: Horst Rahn, Königsberg/Bayern; Helmut Grüll, Riedbach, both of Fed. Rep. of Germany

[73] Assignee: Unicor GmbH, Hassfurt, Fed. Rep. of Germany

[21] Appl. No.: 119,871

[22] Filed: Nov. 13, 1987

[30] Foreign Application Priority Data

Nov. 13, 1986 [EP] European Pat. Off. ........ 86115806.1

[51] Int. Cl.⁴ .................... B29C 33/34; B29C 49/30
[52] U.S. Cl. ...................................... 249/162; 72/61; 72/190; 164/323; 164/330; 164/430; 198/465.2; 425/224; 425/335; 425/342.1; 425/343; 425/387.1; 425/390; 425/395; 425/396

[58] Field of Search ............... 425/233, 223, 224, 369, 425/370, 336, 335, 340, 342.1, 343, 537, 387.1, 388, 390, 392, 394, 395, 396; 164/429, 430, 323, 329, 330, 324; 72/60, 61, 190; 198/465.2

[56] References Cited

U.S. PATENT DOCUMENTS

| | | | |
|---|---|---|---|
| 3,188,690 | 6/1965 | Zieg | 425/396 |
| 3,776,679 | 12/1973 | Hegler | 425/539 |
| 3,779,684 | 12/1973 | Folkes | 425/233 |
| 3,784,346 | 1/1974 | Maroshak | 425/539 |
| 4,212,618 | 7/1980 | Hegler et al. | 425/233 |
| 4,504,206 | 3/1985 | Lupke | 425/233 |
| 4,662,428 | 5/1987 | Trendov | 164/425 |

Primary Examiner—Willard Hoag
Attorney, Agent, or Firm—Armstrong, Nikaido, Marmelstein & Kubovcik

[57] ABSTRACT

The invention relates to an apparatus for the continuous production of pipes with cross-profiled walls from a pipe strand of thermoplastic plastic emerging in still plastic state from an extrusion nozzle.

14 Claims, 11 Drawing Sheets

APPARATUS FOR THE CONTINUOUS PRODUCTION OF PIPES WITH CROSS-PROFILED WALLS

The subject of the invention is an apparatus for the continuous production of tubes or pipes with cross-profiled walls from a pipe strand of thermoplastic plastic emerging in still plastic state from an extrusion nozzle comprising the features of the preamble of claim 1.

Plastic tubes or pipes with cross-profiled walls are made predominantly in the form of so-called concertina tubes, grooved tubes or corrugated tubes which are flexible due to the corrugation of the walls. To make these tubes apparatuses are used which have been known for decades and in which the two sequences of mould halves guided in endless paths circulate unconnected or connected. Such apparatuses are for example known from U.S. Pat. No. 2,866,230 or German utility model No. 1,808,897. In the former apparatus by extracting the air between the wall of the tube and the mould cavity the still plastic plastic tube is caused to bear in close conformation to the moving hollow mould. In the apparatus according to the utility model mentioned for the same purpose an excess pressure is generated in the interior of the tube.

These apparatuses in which the mould halves are guided without spacing consecutively in their endless paths have proved themselves for small and medium pipe sizes. If however it is desired to make very large pipes, for example pipes with a diameter of 25 cm or more, problems are encountered insofar as the mould halves due to the high precision with which they must be made are complicated and expensive and the aim is therefore to manage with the minimum possible number of mould halves. To achieve this objective savings can be made as regards the mould halves being returned because on their return path they are of no use. Thus, according to German specification as laid open to inspection 1,918,336 an apparatus has been developed in which the mould halves are advanced along the working section. At the end of the working section the respective foremost mould halves of the hollow mould are moved apart with the aid of hydraulic cylinders perpendicularly to the feed direction of the moving hollow mould. Then the mould halves thus moved apart are pushed by means of hydraulic cylinders acting in the longitudinal direction of the working section on both sides thereof back onto a stack of mould halves which extends up to the start of the working section. If at the latter there is enough room due to the movement of the hollow mould a further pair of hydraulic cylinders again acting perpendicularly to the working section causes the pair of mould halves located at the end of the return section to be pushed together. After the pushing together said mould half pair is again advanced by a further hydraulic cylinder in the working direction. In this manner it is indeed possible to reduce the number of mould halves necessary. However, the known apparatus has various quite considerable defects. Thus, for example, the hydraulic cylinders for pushing the mould halves apart at the end of the working section and together at the start of the working section must also be moved with the speed of the moving hollow mould.

A further substantial disadvantage of the known apparatus resides in that the return conveyor formed by the hydraulic cylinders in its intermittent operation must always accelerate a stack of mould halves whose length corresponds almost to the entire length of the working section and consequently very high forces are necessary for this purpose. After the pushing back of said stack of form halves this long stack with its high mass must be retarded again and this also presents difficulties. Nevertheless, this known apparatus is basically functionable. It has also been built in practice.

To further develop an apparatus having the features of claim 1 in particular so that a return means is made possible which with low construction expenditure, low speed and low forces of inertia contains only substantially fewer mould halves than the known apparatus, the invention proposes in an apparatus according to the preamble of claim 1 that the conveyors each comprise beneath the base an endless pulling member comprising a run circulating in the conveying direction of the respective conveyor, that the pulling members carry drivers which at the start of the conveying path come into the driver position, come into engagement with the mould halves offered them there, entrain said mould halves and at the end of the conveying path can come out of engagement with the mould halves again, that guide elements are provided for parallel guiding of the mould halves in the region of the return means and that the mould halves are moved in spaced relationship with each other in the region of the return means.

One manner of managing with a minimum number of mould halves is described and illustrated already also in European Pat. No. 0 007 556. In this patent specification adjacent the working section a carriage moves in reciprocal manner, said carriage carrying grippers by means of a linkage. At the end of the working section the grippers can each grip one mould half, move it to the side of the working section, whereupon the carriage with the mould half then returns to the beginning of the working section and there by appropriate pivoting of the linkage the mould half is replaced at the start of the working section. This principle appears very attractive but has the essential disadvantage that a very heavy structure is necessary because in the short time in which the moving hollow mould covers the length of a single mould half a mould half must be brought out of the region of the hollow mould, and returned and reintroduced into the region of the hollow mould. This leads not only to high inertia forces but as a result means that the carriage and the linkage must be made extremely robust to be able to freely support the mould half during the lifting, return and replacement movement, this further increasing the inertia forces.

These problems do not occur in the invention because in the latter several mould halves are always present on the return path simultaneously so that only small speeds are necessary and in addition the heavy reciprocated masses of the apparatus according to the European patent are not necessary. The conveyors with which the invention operates satisfactorily are light and simple and can circulate continuously and at a speed which is very small compared with the speeds which occur in an apparatus according to E-PS No. 0 007 556.

If the apparatus according to the invention is to be made even simpler, as is extremely desirable, the precision necessary for the drive, guides and the like can be substantially reduced if in accordance with claim 2 the stations adjacent the start and end of the working section are constructed as waiting stations in which the mould halves are left standing by the return conveyor or transverse conveyor before they are engaged a short time thereafter by the transverse conveyor or return conveyor and brought back to the start of the hollow mould or the position adjacent the start of the working section. To retard the mould halves in these waiting positions the frictional force between the mould half and the base is generally sufficient.

The traction members or pulling members are preferably chains. However, basically it is also possible to use as traction or pulling members for example correspondingly high-strength toothed belts, the latter even having because of their elasticity certain advantages for the acceleration processes at the start of each conveyor. However, because of the high service life chains are preferred, in particular plate link chains (claim 3).

If it is desired to make do with particularly simple guide elements in the region of the transverse conveyors then according to claim 4 the drivers of the transverse conveyors can be formed as strips which extend perpendicularly to the conveying direction thereof, i.e. parallel to the working section, and which co-operate with correspondingly extending abutment faces of the mould halves and guide the latter during the transverse conveying path in their parallel position. A particular advantage of this strip formation is that as long as the corresponding mould halves at the end of the working section are still in engagement with the moving hollow mould and at the start of the working section are already in engagement with the moving hollow mould a displacement of the mould halves in the travelling direction of the hollow mould can be readily superimposed on the conveying by the transverse conveyors because the mould halves can slide along said strips in the longitudinal direction of the latter.

To ensure with low constructional expenditure that the drivers of the transverse conveyors at the end of the working section engage at the lower side of the mould halves initially still belonging to the moving hollow mould and on the other hand at the start of the working section the transverse conveyors do not collide with the drive usually located there for the moving hollow mould, in accordance with claim 5 the drivers of the transverse conveyors at the end of the working section can co-operate with the flanks of grooves provided on the lower sides of the mould halves and the drivers of the transverse conveyors at the beginning of the working section can co-operate with the surfaces of the mould halves remote from the hollow mould.

Since the transverse conveyors are very short compared with the return conveyors the inherent elasticity in their traction or pulling members is particularly small. Consequently, to obtain the maximum possible working speeds and to enable even very large mould halves to be handled the drivers of at least the transverse conveyors will advantageously be secured to their pulling members in resiliently yielding manner in the conveying direction (claim 6).

Fundamentally, the mould halves in the region of the return conveyors may for example be guided in that said mould halves are guided in form-locking engagement with correspondingly formed drivers of the pulling members.

However, the construction becomes particularly simple if in accordance with claim 7 the mould halves in the region of the return conveyors are guided at ribs of the bases extending in the conveying direction. For this purpose the grooves in claim 5 referred to above can be guided at the lower side of the mould halves on the ribs of the bases substantially filling said grooves. In this manner only a single rib is required for reliable guiding.

To permit an exact retardation of the mould halves at the respective end of the conveying path, i.e. in the waiting stations (the mould half must of course be offered to the next conveyor in such a manner that its driver can reliably engage in the correct position) a quite considerable precision is necessary in the structure and dimensions of the corresponding conveyor. This can be avoided if in accordance with claim 8 at the end of the conveying path in each case (except for the start of the hollow mould), i.e. at the waiting stations, positioning stops for the mould halves are provided. Said positioning stops can advantageously be formed as simple upwardly projecting ribs, said ribs then each extending perpendicularly to the conveying direction of the conveyor (which does not always coincide with the movement direction of the mould half during the conveying by the conveyor). These positioning stops may if necessary be amplified by guide strips which are provided at the end of the movement of the mould half and which guide the mould halves at the end of their conveying by the respective conveyor in the longitudinal direction thereof.

To ensure reliable introduction of the mould halves at the start of the working section into their position at the moving hollow mould additional guide elements may for example be provided for instance in the form of guide ribs on the base which co-operate with corresponding grooves on the lower side of the mould halves. Even if the toothing usually necessary for driving in the region of the working section is provided at the lower side of the mould halves such guide grooves can still be arranged transversely of the toothing. However, the construction becomes substantially simpler and more favourable if in accordance with claim 9 the mould halves of each sequence or train at their end faces engaging in the working section on the leading and trailing mould half comprise interfitting complementarily shaped transverse ribs or grooves which guide the mould halves of each sequence during the pushing together at the start of the working section on the hollow mould guided rigidly in said working section. By corresponding bevelling of such guide ribs and grooves at the end faces of the mould halves a reliable introduction thereof into each other at the start of the working section can be facilitated. From the constructional point of view the configuration according to claim 10 is advantageously such that the 4 transverse conveyors are made identically, that the transverse conveyors at the start of the working section lie laterally further remote from said working section than the transverse conveyors at the end of the working section by an amount corresponding to the distance of the grooves at the lower side of the mould halves from the side faces of the mould halves remote from the hollow mould, that the return conveyors engaging the leading end faces, in the working direction, of the mould halves with their drivers are arranged a smaller lateral distance from the working section than the deflection wheels of the transverse conveyors remote from the working section at the start of the latter, that the start of the return conveyors lying in each case at the end of the working section is remoter from the associated transverse conveyor at the start of the working section than the transverse conveyor at the end of the working section and that the latter conveyor lies between the working section and the associated transverse conveyor.

Such an arrangement avoids the danger of collision of the various conveyors which might be feared at first.

If, as is preferred, in accordance with claim 11 the travelling hollow mould is driven by means of a gear shaft disposed at the start of the working section and co-operating with a toothing at the lower side of the mould halves, the transverse conveyors at the end of the working section may advantageously be driven in that the toothing of the mould halves via a gear arrangement at the end of the working section drives the transverse conveyors disposed there. In this manner satisfactory synchronization is also ensured. The other conveyors are advantageously driven via intermediate gears by the gear shaft.

The apparatus according to the invention can be developed in particularly advantageous manner so that individual tubes with profile varying over the length and with greater differences in length than hitherto possible can be made without waste or producing pipe lengths not in themselves desired. It is frequently necessary to make pipes of finite length which do not have the same profile over their length, for example corrugated pipes which at one or both ends are provided with sleeves. Such pipes can be made with the known machines in that for example in every fifth pair of mould halves the profiling is modified so that a sleeve is formed and the resulting pipe strand is severed at the corresponding points. However, this method can be used to make without waste only pipes whose total length is equal to the total length of all the mould halves in each of the two mould half sequences or trains. Thus, if for example a pipe is desired whose total length is equal to the length of two-thirds of the mould halves of a mould half sequence then further tubes are likewise produced as it were as waste, the total length of said further tubes being equal to a third of the total length of a sequence. This very greatly restricts the production possibilities with a given mould half set for pipes irregularly profiled over their length.

The invention obviates this defect in that in accordance with claim 12 the return means are constructed for receiving and transporting different numbers of mould halves. Thus, for example, selectively 10 or 12 mould halves may circulate in each sequence without changing the number of for example 7 to 8 mould half pairs in the working section.

Thus, if the number of the die halves located on each return conveyor is reduced for example by two then apart from pipes having a total length of 12 dies pipes having a total length of 10 dies may also be made. As is readily apparent this makes the use of the apparatus extremely flexible.

If in an apparatus according to the invention in the return of the mould halves the latter are conveyed by the return conveyor consecutively and spaced apart the substantial advantage is achieved that the return conveyor can operate continuously and that the entire mass of the die halves located on the return conveyor need not be simultaneously accelerated and retarded. On the contrary, in this case, if for example 3 dies are on the return conveyor, only the foremost die half, i.e. that in the region of the start of the working section, need be retarded and only a further 4 the die half at the start of the return section, i.e. at the end of the working section, need be accelerated by the return conveyor up to the return speed again.

A particularly advantageous further development of the apparatus according to claim 12 is that in accordance with claim 13 the ratio of the circulating speed of two return conveyors with respect to that of the 4 transverse conveyors is adjustable and that the drivers of each return conveyor can be secured in different numbers and at different intervals to the pulling member thereof or alternatively be mounted in intervals on the pulling members corresponding to different numbers of mould halves.

A perfect synchronization of the various conveyors with the drive of the hollow mould is achieved in particularly advantageous manner in accordance with claim 14 in that in an apparatus in which the hollow mould is driven by means of a gear shaft disposed at the beginning of the working section and co-operating with a toothing on the lower side of the mould halves a shift gearing driven jointly and synchronously with the gear shaft drives the pulling members of the return conveyors with selectable speed whilst the transverse conveyors are driven with invariable transmission ratio with respect to the gear shaft. This enables the conveying speed of the return conveyor to be adapted to different numbers of mould halves disposed in the return conveyor region. Such an adaptation is not necessary in the case of the transverse conveyors.

The result is that if for example the number of mould halves disposed on the return conveyor at the same time is reduced from 4 to 2 the speed of the return conveyor can be doubled. To avoid having to use a separate pulling or traction member for each number of mould halves, which is of course also possible (the expenditure for the pulling member, which is normally a plate link chain, is extremely small), the drivers can be arranged on the pulling member of each conveyor at the desired intervals which can easily be determined by calculation. Thus, for example, when a plate link chain is used one chain link can carry the corresponding driver in each case. If it is desired to save this expenditure as well and if for example only two different pipe lengths are to be produced with profiling differing over the length, it may suffice in many cases to attach the necessary drivers to the chain for both tube lengths, i.e. for both numbers of mould halves simultaneously disposed on the return conveyor. In this case it must of course be ensured that the drivers which do not happen to be required do not collide with the mould halves entrained by the necessary drivers. If this cannot be avoided the only solution is to remove the drivers which are not required and would collide.

The adaptation to different numbers of mould halves on the return conveyor is particularly advantageous in the apparatus according to claims 1 to 11. It may however also be employed to advantage in other apparatuses according to the preamble of claim 1.

For application to the machine according to DE-OS No. 1,918,336 it suffices for example to remove two die halves from each return conveyor 2. However, if this is done the stroke of the hydraulic cylinders effecting the return conveying must also be correspondingly enlarged. It is however also possible to arrange the corresponding hydraulic cylinders movably on a carriage so that for the return movement of the mould halves which have just arrived at the end of the working section the hydraulic cylinder effecting the return movement not only extends its piston but in addition is also itself driven back in the direction of the start of the working section. If furthermore the return movement is controlled so that in one stroke the entire column of mould halves is returned and only in a subsequent stroke are the mould halves just being withdrawn from the end of the hollow mould returned to the column again the maximum mass to be moved is still further reduced.

The return conveying of the mould halves at intervals can for example be effected in that in the known apparatus according to DE-OS No. 1,918,336 the die halves simply pushed by the return hydraulic cylinders over the base execute their return movement on circulating conveyor belts, the hydraulic cylinder effecting the return conveying then only having to push the mould half withdrawn by the transverse conveying hydraulic cylinder from the end of the working section a slight distance further onto the conveying belt, which then conveys the mould half back. It is apparent that with such a procedure an entire column of mould halves disposed on the return conveying section is no longer necessary. On the contrary, only a very small number of mould halves is necessary on the return conveying section so that this configuration according to the invention provides a further saving of mould halves.

At the end of the return conveying section, i.e. at the start of the working section, the mould half can then be pushed from the conveyor belt again onto a table where it is retarded by friction and for example runs again a stop. This stop also aligns the mould half to such an extent that the transverse conveyor located here by means of its hydraulic drive can now push the mould half together again with the corresponding mould half of the opposite mould to give the hollow mould. As a result the machine also permits a substantially lighter, simpler and more reliable structure of the apparatus.

Hereinafter the preferred embodiment of the invention will be described as illustrative example with the aid of the attached drawings.

FIGS. 8 A to 8 I each show in the upper half an apparatus according to the invention having 12 mould halves in various consecutive circulation positions and in the lower half the same apparatus having a mould half number reduced by 2 to 10 in the corresponding circulation positions.

The apparatus according to the invention shown in highly schematic form in the Figure comprises a horizontal base plate 1 on which the mould halves 2 A to 2 G of the right mould half sequence circulating in the direction indicated by arrows and the corresponding mould halves 3 A to 3 G of the left mould half sequence are shown for simplicity as rectangular blocks with corresponding semicylindrical recesses, said semicylindrical recesses complementing each other to form an inner circumferentially corrugated tubular mould passage 100 along the working section, i.e. along the path in which the two mould half trains or sequences are brought together to form the closed hollow mould 8 shown in the middle and travelling in the direction of the arrow.

Figure 1:
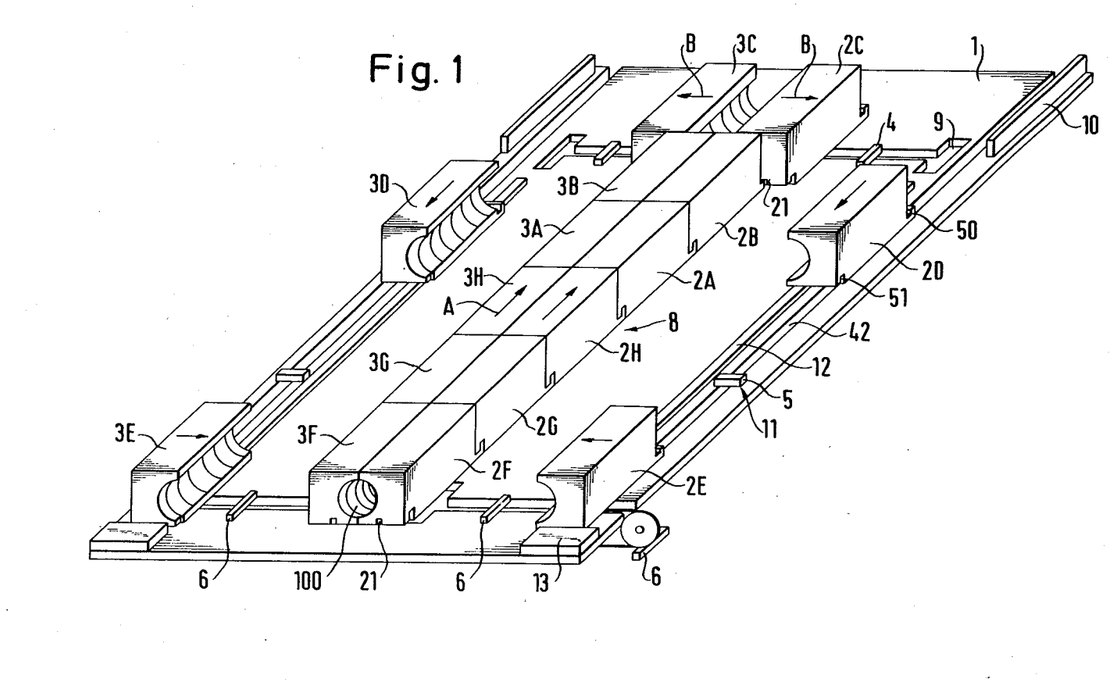
FIG. 1 shows in greatly simplified form in perspective view the basic construction of the apparatus according to the invention.

In FIG. 1 the position of the individual mould halves 2 A to H and 3 A to H is not shown exactly. The exact positions for an example of embodiment are apparent from FIGS. 8 A to 8 I. Likewise, the position of the drivers 4, 5 and 6 of the transverse conveyors 7, 15 and the return conveyor 11 are not correctly shown in order to permit illustration of these elements as well in FIG. 1. However, an exact illustration in this respect is not essential to the understanding of the invention. In FIG. 1 the still soft thermoplastic pipe enters at the end facing the observer the mould passage 100 of the travelling hollow mould 8 which is formed here from the mould halves 2 A, B, F, G and H and 3 A, B, F, G and H. At the end remote from the observer, where the two mould halves 2 C and 3 C have already moved a distance apart, i.e. at the end of the working section, the now shaped pipe strand, not shown, hardened by cooling emerges again.

As a glance at FIG. 1 will show the hollow mould 8 travels in the direction of the arrow A to be separated again at the end remote from the observer whilst at the end facing the observer the hollow mould is continuously again returned to the original length by again bringing together new mould half pairs (the next mould half pair to be brought together at the start of the hollow mould again is in this case the mould half pair 2 E and 3 E).

Figure 2:
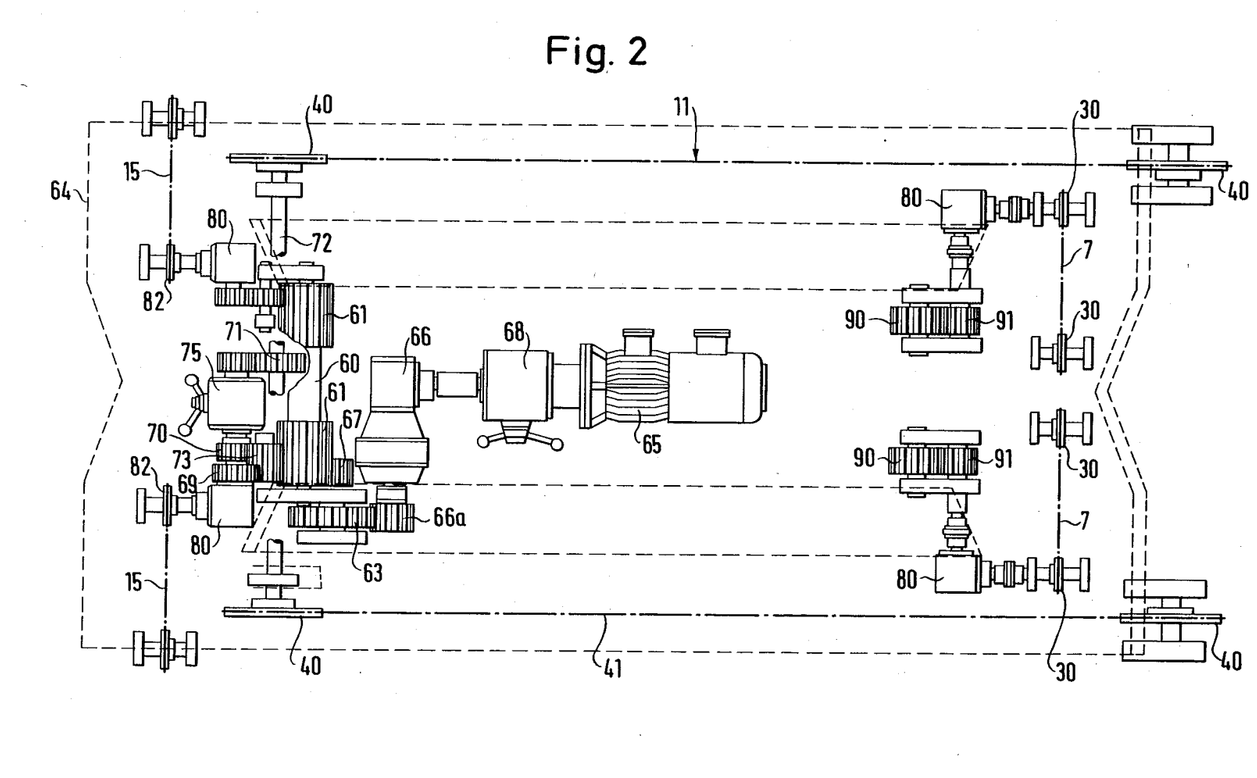
FIG. 2 shows the view from above of the drive means used in the apparatus of FIG. 1 and arranged substantially beneath the base plate forming the base in FIG. 1.
Figure 3:
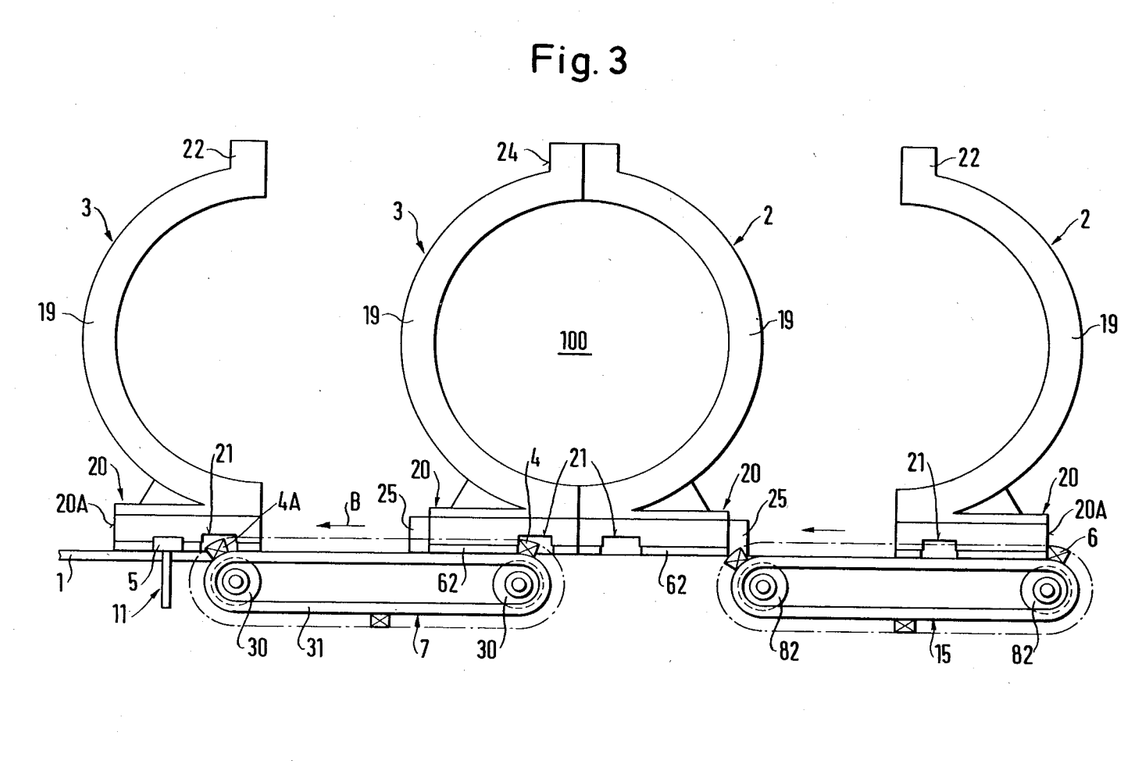
FIG. 3 shows in highly schematic form a vertical section through the apparatus according to the invention, not all parts being shown; in the right half the transverse conveyor at the start of the working section is shown and in the left half the transverse conveyor at the end of the working section.

At the end of the working section remote from the observer in FIG. 1 the mould halves arriving are engaged by the drivers 4 of the transverse conveyors 7, not shown until FIGS. 2 and 3 and not illustrated in FIG. 1, and pushed apart in the direction of the arrows B.

When after this pushing apart movement, on which at the start a movement in the travelling direction of the hollow mould 8 is superimposed, the drivers 4 move downwardly through corresponding openings 9 of the base plate 1, the particular mould halves moved apart there come rapidly to a standstill because of the friction on the base plate 1. Their exact position is ensured by the mould halves running against corresponding positioning stops 10.

From the position at the positioning stop strip 10 the corresponding mould half is now engaged with the aid of the driver 5 of the corresponding return conveyor 11 and returned parallel to the working section on a guide strip 12 in sliding manner back to the level of the start of the working section. The corresponding mould half there comes to a standstill in the position of the mould half 2 E where it is aligned by a further positioning stop strip 13. From this position the corresponding mould half is now engaged by a driver 6 of the transverse conveyor 15 brought up to said half from the outside and said mould half is pushed perpendicularly to the movement of the travelling hollow mould 8 onto the latter until it is engaged by the latter and brought into the correct position of the travelling hollow mould in the last portion of the bringing together guided in a manner to be explained below. The two mould halves 2 F and 3 F are illustrated in this position in FIG. 1. The two mould halves 2 F and 3 F now again form the start of the travelling hollow mould and immediately the next mould half pair—in FIG. 1 the mould halves 2 E and 3 E—is added whilst at the end of the working section further mould halves are removed again and returned.

The mould halves 2 A and 2 H are made laterally inverted with respect to the mould halves 3 A and 3 H. Below only the mould halves of the sequence 3 are described.

Figure 5:
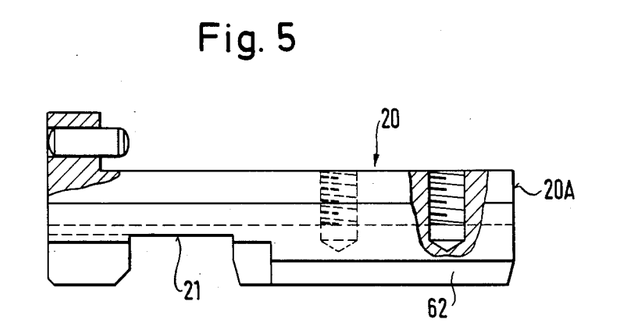
FIG. 5 is a view of the mould half lower portion of the mould half sequence on the left in FIG. 1, observed from the end of the working section.
Figure 6:
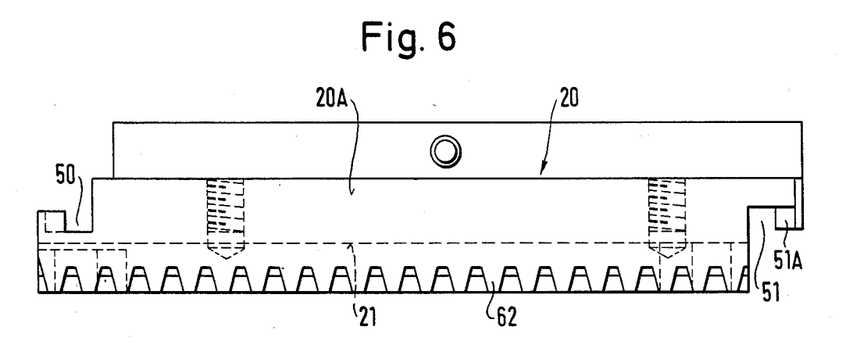
FIG. 6 is a view from the right of FIG. 5.
Figure 7:
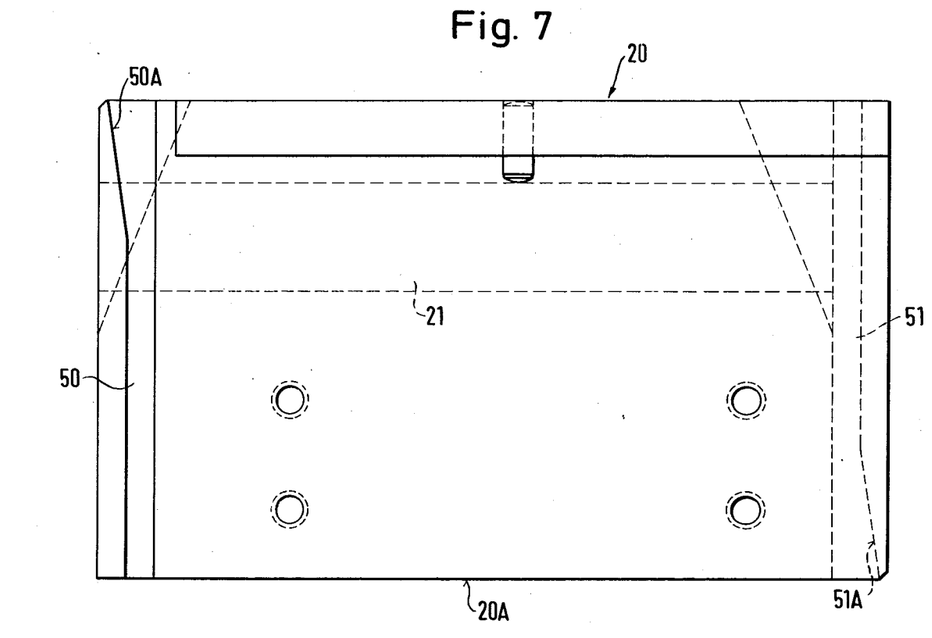
FIG. 7 is a view from above of FIG. 6.

Each mould half 3 A to 3 H of the mould half sequence 3 has a mould half lower portion 20, one of which is shown to a larger scale in FIGS. 5 to 7. On the mould half lower portion 20 the mould half upper portion 19 is secured by means of screws, not shown, in the position apparent in FIG. 3. The mould half upper portion 19 forms together with the corresponding upper portion of the opposite mould half the mould passage 100. (middle of FIG. 3) in the region of the working section. The mould half upper portion 19 has substantially the form of a semicylindrical shell which has an edge rib 22 at the upper side. The edge ribs of the two mould halves of each mould half pair are guided on the working section at the top by means of a guide 24 which is shown only in FIG. 3. The mould halves are displaceable on the base plate 1 (FIG. 3). In the region of the working section the two mould half sequences are guided not only at the upper side by means of their edge ribs 22 but also in the region of the base plate 1 where for this purpose 2 guide ribs 25 are provided (FIG. 3). In the region of the working section the mould half lower portions 20 each slide with their vertical side walls remote from each other on said guide ribs 25 so that the excess pressure obtaining in the interior of the still thermoplastically deformable plastic pipe located in the mould passage 6 is unable to press the mould halves 2, 3 apart. The guide ribs 25 extend in the direction of the working section in FIG. 1 substantially from the beginning of the mould half pair 2 G and 3 G to the middle of the mould half pair 2 B and 3 B. They must end early enough to ensure that the mould halves can be moved apart at the end of the working section and must not start so late that before their beginning the pushing together of the mould halves at the start of the working section is completed.

Figure 4:
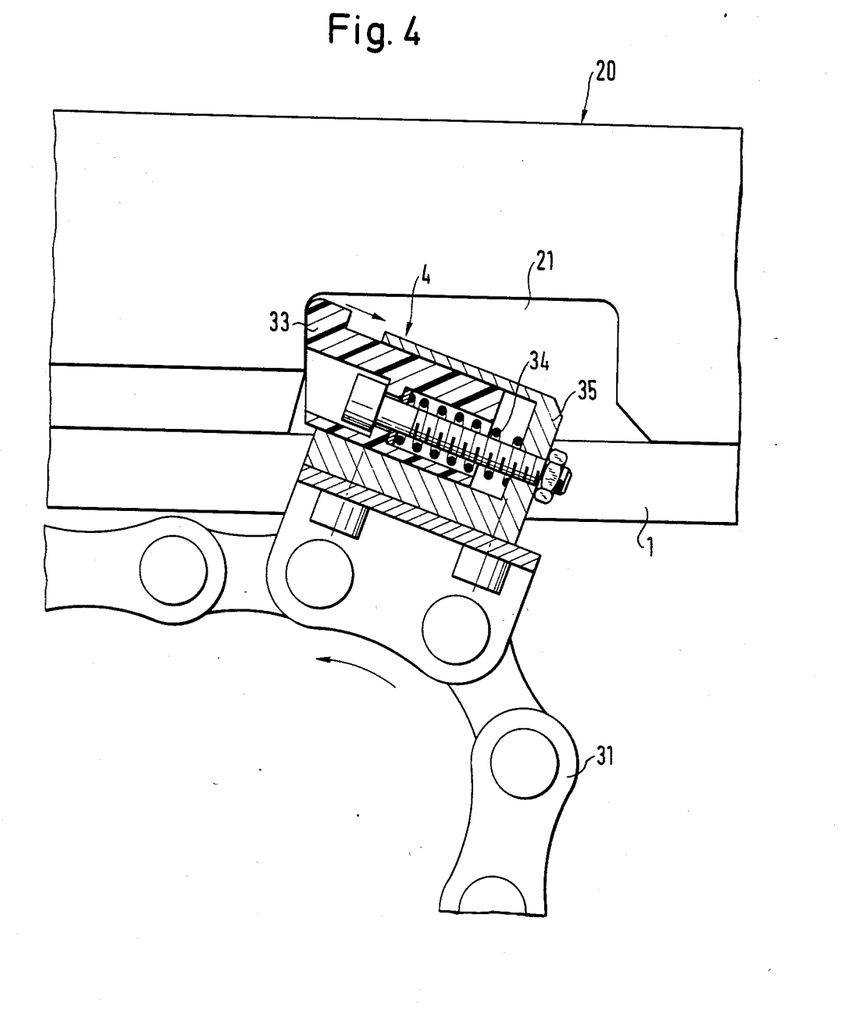
FIG. 4 shows to a larger scale than FIG. 3 the yielding arrangement of the driver at one of the transverse conveyors, the view corresponding to that of FIG. 3.

The two transverse conveyors 7 provided at the end of the working section serve to push the mould halves 2, 3 apart (when the mould halves are described in general manner the letter designating the particular mould half will be omitted in the following description). Each transverse conveyor 7 is formed substantially by two sprockets 30, a chain 31 led thereover and a driver 4 secured to the chain 31. Each driver 4 consists of a plastic strip 33 which extends in FIGS. 3 and 4 perpendicularly to the plane of the drawing over a length substantially equal to a quarter of the length of each mould half in the working direction. The strip thus extends parallel to the travelling direction of the hollow mould 8. It is mounted in the manner shown in FIG. 4 in a strip holder 35 to be resiliently displaceable transversely of its longitudinal extent against the action of a spring 34. The holder 35 is in turn secured to a link of the chain 31, as also apparent from FIG. 4. The chains 31 of the transverse conveyors 7 at the end of the working section circulate in planes running perpendicularly to the travelling direction of the hollow mould. Their position is apparent in FIGS. 2 and 3. Each strip 33 of the driver 4 of a transverse conveyor 7 is bevelled at its front edge coming into engagement wit the corresponding mould half 2, 3, as likewise apparent from FIGS. 3 and 4. To move the mould halves apart in the region of the corresponding sprocket 30 when the chain runs round the latter the driver 4 penetrates through a corresponding slot in the base plate 1 beneath the hollow mould 8 upwardly beyond the base plate 1 and there enters a substantially rectangular groove 21 provided at the lower side of the corresponding mould half lower portion 20 and extending parallel to the travelling direction of the hollow mould 8. The leading edge of the strip 33 now comes into engagement with the corresponding wall of the groove 21 and entrains the mould half in the direction of the arrow B in FIGS. 1 and 3. To reduce the shock on accelerating the mould halves 2, 3 the resiliently yieldable mounting of the strip 33 is provided. Since during the entering into engagement the mould half is still moving with the hollow mould 8 in the travelling direction thereof the travelling movement of the hollow mould is first superimposed on the lateral separation movement of the mould halves 2, 3. This means that the mould halves 2, 3 at the end of the working section are not initially moved perpendicularly to the travelling direction of the hollow mould but moved away obliquely laterally thereof. The friction on the base plate 1 after the mould halves have come out of engagement with the travelling hollow mould retards this movement component in the direction of the hollow mould travel rapidly and in the last portion of the lateral separation movement the mould half 2, 3 moves substantially perpendicularly to the travelling direction of the hollow mould. To permit a sliding of the mould half 2, 3 together with the hollow mould 8 during the moving apart in the direction of the hollow mould movement the groove 21 permits a displacement of the strip 33 in the longitudinal direction thereof. The driver 4 finally dips down again through the base plate 1 in the position 4 A shown again on the left in FIG. 3 so that in this position by the friction and, if necessary, by the flank of the mould half lower portion 20 running against the positioning stop said mould half 2, 3 immediately comes to a standstill. The mould half is now aligned at the positioning stop 10 in the draw-in region of the corresponding return conveyor 11.

Each of the two return conveyors 11 has two identical sprockets 40 (FIG. 2) via which a link plate chain 41 is guided in a vertical plane. The link plate chain 41 carries a number of drivers corresponding to the number of mould halves 3 or 2 to be conveyed in spaced relationship. If for example (according to the top of FIG. 8) a sequence of 12 mould halves is provided, of which in each case 8 are in the working section, then in the example each chain 41 carries nine drivers 5. The drivers 5 of the return conveyor must be made less yielding than the drivers 4 and 6 of the transverse conveyors. For conveying the mould halves back a driver 5 of the corresponding return conveyor 11 penetrates upwardly beyond the base plate 1 in the region of the positioning stop 10 through a slot 42 of said base plate 1 extending parallel to the travelling direction of the hollow mould and comes into engagement with the end face of the corresponding mould half lower portion 20 remote from the observer in FIGS. 1 and 3. During its travel on the upper run of the chain 41 the driver 5 in this manner entrains back the corresponding mould half and moves it against the positioning stop 13 in the region of the start of the working section where the driver again dips downwardly over the corresponding sprocket 40 of the return conveyor 11. Any remaining retardation of the mould half which might be necessary is effected by the positioning stop strip 13. In a corresponding constructional embodiment the positioning stops 10, 13 may even be omitted.

During the return travel of the mould half 2, 3 from the end of the working section to the start thereof the mould half is guided respectively on a rib 12 which extends parallel to the return conveying direction and on which the mould half lower portion slides and is guided by means of the groove 21. As apparent from FIG. 2 the return conveyor 11 is in each case at a greater distance from the travelling hollow mould 8 than the sprocket 30 of the corresponding transverse conveyor 7 remote from the travelling hollow mould at the end of the working section. The construction is such that the vertical circulating plane of the chain of the return conveyor 11, which of course runs parallel to the separating plane of the travelling hollow mould, contains the centre of gravity of the respective mould half and the centre of the driver 5. This avoids any troublesome pivot inertia forces during the return conveying and also at the start and end thereof due to the co-operation of the mould half with the driver 5 of the corresponding return conveyor 11.

To enable the transverse conveyor 7 at the end of the working section and the transverse conveyor 15 at the beginning thereof to be constructed identically the transverse conveyor 15 at the start of the working section is arranged at a greater distance from the latter than the transverse conveyor 7. This avoids collision of the elements of the transverse conveyor 15, which is otherwise made identically to the transverse conveyor 7, with the drive for the travelling hollow mould 8. Accordingly, the driver of the transverse conveyor 15, which is constructed like that of the transverse conveyor 7, does not engage the groove 21 at the lower side of the corresponding mould half 2, 3 but at the rear side 20 A of the mould lower portion 20 remote from the mould separating face. The co-operation of the driver 6 with said surface 20 A is shown in the right half of the drawing of FIG. 3. The transverse conveyor 15 at the start of the working section merely effects a transverse shifting perpendicularly to the direction of movement of the travelling hollow mould 8. The two mould halves 2 and 3 to be pushed together here and joined to the hollow mould must however in the latter portion of their closure movement be given simultaneously a movement in the travelling direction of the hollow mould 8 to enable them to move on without any gap with the mould half pair which they follow and thus to form an extension of the hollow mould. Since it engages the face 20 A extending parallel to the travelling direction of the hollow mould, the driver 6 of the transverse conveyor 15 fundamentally allows such a movement before the driver 6 at the end of its entraining movement dips beneath the base plate 1 again when the two co-operating mould halves 2, 3 meet each other at the start of the working section.

To ensure proper joining of the mould halves 2, 3 to the travelling hollow mould 8 each mould half 2, 3 is provided at its leading face and rear face with a transverse profiling 50, 51, the front profiling 50 being made complementary to the rear profiling 51 so that said profilings can engage in each other and effect in the travelling direction a locking of the mould halves 2, 3 forming the travelling hollow mould 8. In practice the construction is such that at the bottom at the end wall of each mould half lower portion leading in the hollow mould 8 a forwardly projecting rib 50 extends which is bent upwardly at a distance from the end wall. The trailing end wall has at its lower edge a corresponding milled recess which is shaped complementary to the rib 50 with its end upwardly as shown in FIG. 1 and FIGS. 5 to 7. Now, when the two mould halves 2 and 3 are pushed together at the start of the working section the form-locking rib 50 of each of the two mould halves being pushed together enters the complementary form-locking groove 51 at the trailing end wall of the last pair of the mould halves so far forming the hollow mould 8 so that the latter entrains the two mould halves being connected to its trailing end. The last portion of the pushing together of the two mould halves thus takes place whilst these mould halves are already hooked to the hollow mould 8 and being entrained by the latter. When the two mould halves have been completely joined together they enter the guide 24 in the upper region and in the lower region with their side faces 20 A come between the guide strips 25 so that a hollow mould firmly held together moves along the working section.

To avoid having to provide excessive precision in the construction for the "threading" of the rib 50 into the groove 51 at the end of the travelling hollow mould the corresponding ends of the rib 50 are bevelled at 50 A and those of the groove 51 are bevelled at 51 A.

Hereinafter the drive for the hollow mould 8 and the return means 15, 11, 7 will be described.

Since the entire transport and conveying movements must be synchronized, according to the invention the drive for the return means is taken from the drive for the hollow mould.

The hollow mould is driven in the generally usual manner known for example from utility model No. 1,808,897 by a gear shaft 60 disposed at the start of the working section and carrying a double gear 61 whose teeth co-operate for the advancing of the hollow mould in the travelling direction thereof with a toothing 62 on the lower portion 20 of the respective mould half 2, 3.

The drive means is shown in detail in FIG. 2. It is disposed substantially beneath the base plate 1, the outer outlines of which are shown in FIG. 1 at 64.

As apparent from FIG. 2 the gear shaft 60 is driven by a bevel gear planetary gearing 66 via the output pinion 66 a thereof and two intermediate gears 63 and 67. The bevel gear planetary gearing 66 is driven in turn by a drive motor 65. If the apparatus is also to be suitable for various pipe sizes and/or speeds a shift gear 68 is conveniently disposed between the drive motor 65 and the gearing 66 and permits the machine to be driven with different speeds.

Via intermediate gears 69, 70, 73 the two pinions 61 of the gear shaft 60 drive the drive gear 71 of the drive shaft 72 for the two return conveyors 11 of the apparatus. The shaft 72, which is mounted in the machine frame in suitable manner, carries at each of its two ends one of the same deflection gears 40 at the two ends of the return conveyors 11. At the start of the return conveyor idling entrained sprockets 40 are provided over which the chains 41 of the return conveyors are led. In this manner the two return conveyors are driven in exact synchronism and the relation between the position of each driver on one of the return conveyor chains relatively to the remaining drive mechanism and the position of the mould halves 2, 3 is exactly defined.

If the apparatus is also to operate with different mould half numbers in each mould half sequence a change-speed or shift gear 75 is interposed between the gear 69 and the gear 71 on the drive shaft for the two return conveyors and makes it possible to operate with different working speeds depending on the number of mould halves 2, 3 to be conveyed simultaneously by the return conveyors 11.

To drive the two transverse conveyors 15 two identical bevel gear mechanisms 80 are provided at the start of the working section and are driven in identical manner via gears 69, 73 with the same transmission ratio by the drive pinion 61, as apparent from FIG. 2. The output shaft of each bevel gear angled mechanism 80 carries the sprocket 82 of the transverse conveyor 15 adjacent the hollow mould so that the two transverse conveyors 15 are always driven with a speed in a fixed ratio to the travelling speed of the hollow mould.

The drive of the two transverse conveyors 7 at the end of the working section is taken from the toothing at the lower side of the travelling hollow mould. For this purpose beneath the base plate 1 in the region of each of the two "racks" 62 at the lower side of the hollow mould a pinion 90 is mounted which via an intermediate pinion 91 again drives a bevel gear mechanism 80. On the output shaft thereof the driven sprocket 30 of the transverse conveyor 7 at the end of the working section is again mounted. In this manner perfect synchronism of the transverse conveyor drive with the drive for the travelling hollow mould is guaranteed in this case as well.

In the example of embodiment illustrated it is to be possible to operate the apparatus firstly with 12 mould halves in each sequence but secondly also with 10 mould halves in each sequence. Since the number of mould halves to be returned by the return conveyor in unit time is twice as great with 12 mould halves than with only 10 mould halves, provided that always eight mould halves are in the region of the working section, the shift gear 75 is designed for two different transmission ratios, one of which is twice as great as the other.

Figure 8A:
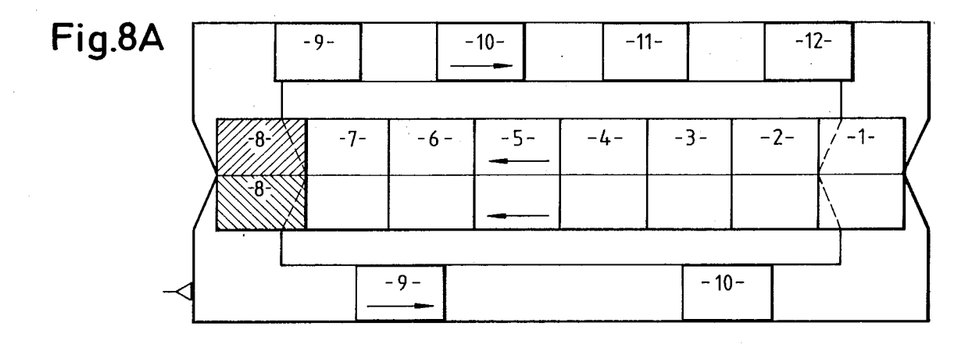
Figure 8B:
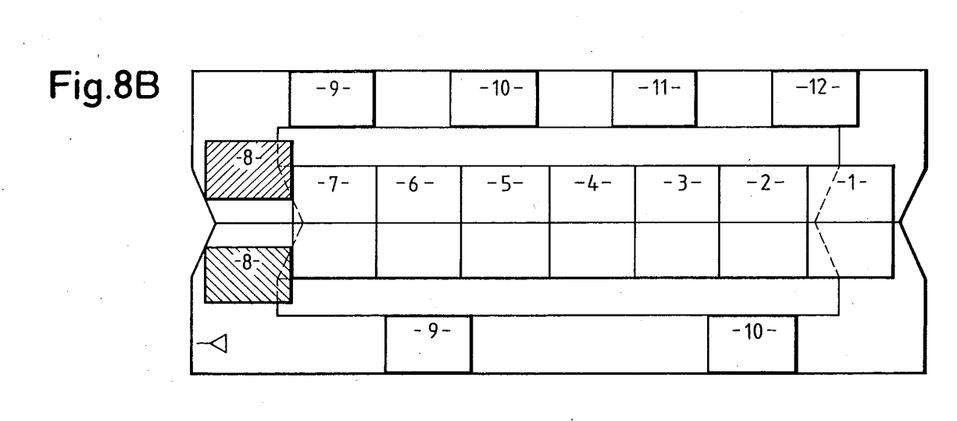
Figure 8C:
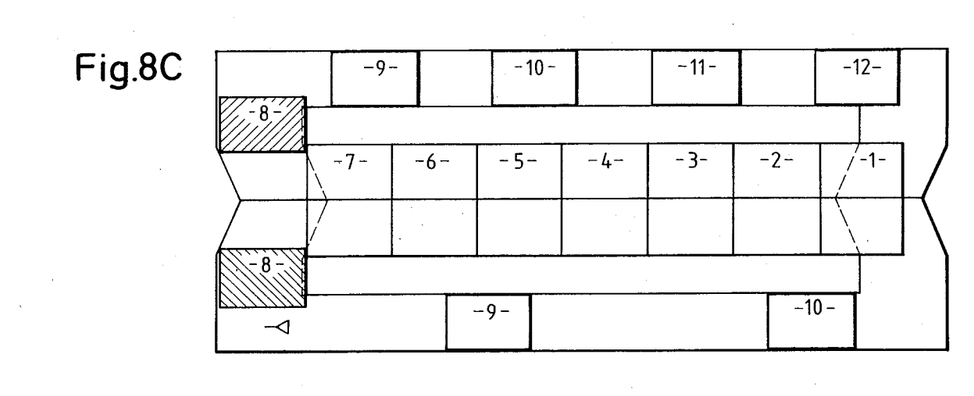
Figure 8D:
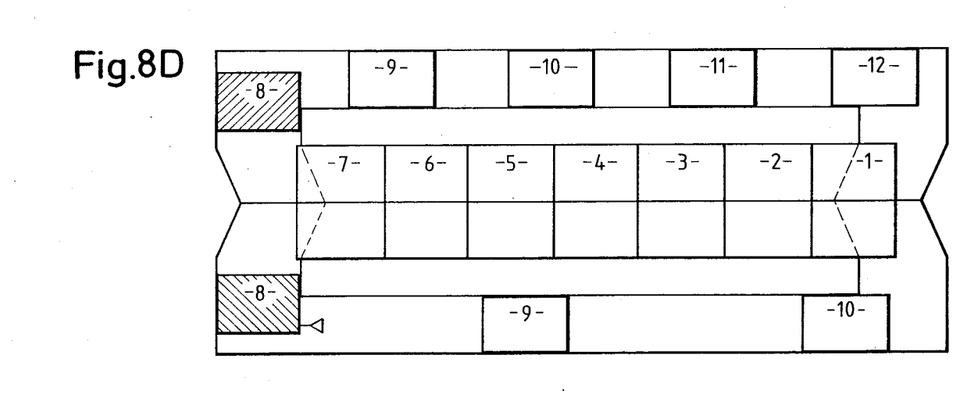
Figure 8E:
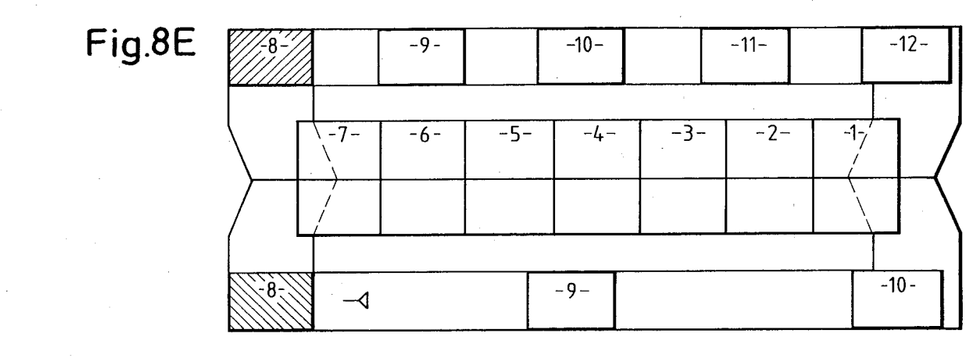
Figure 8F:
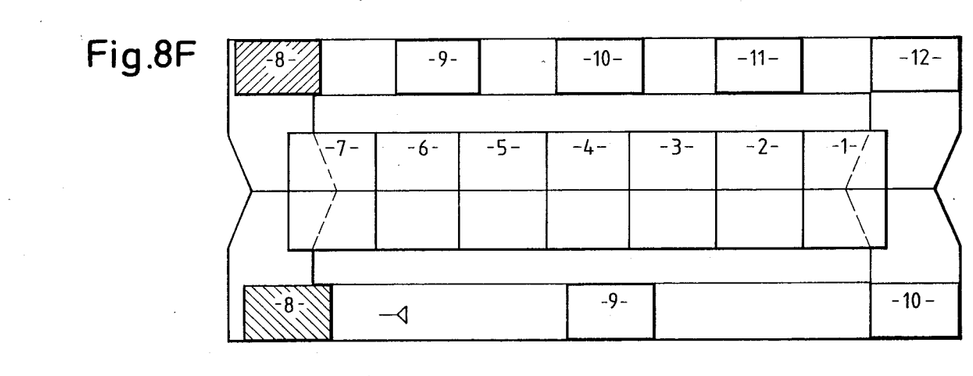
Figure 8G:
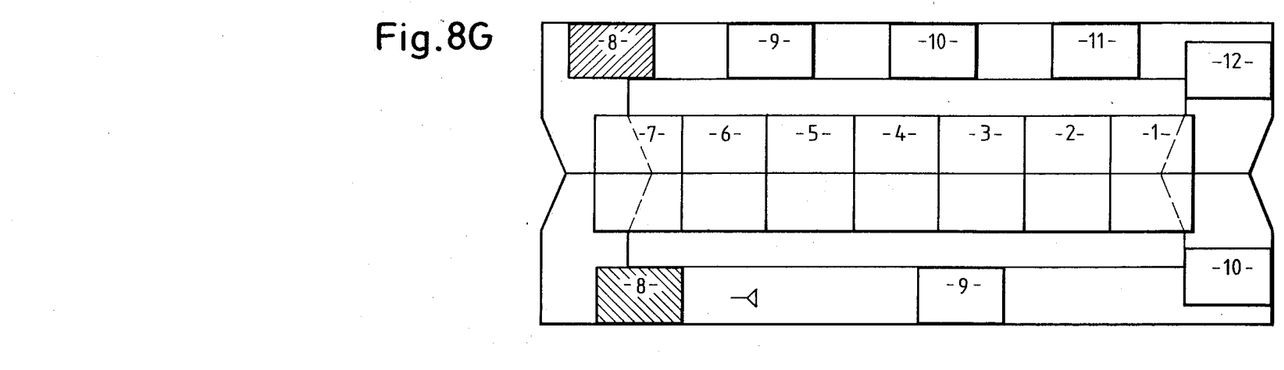
Figure 8H:
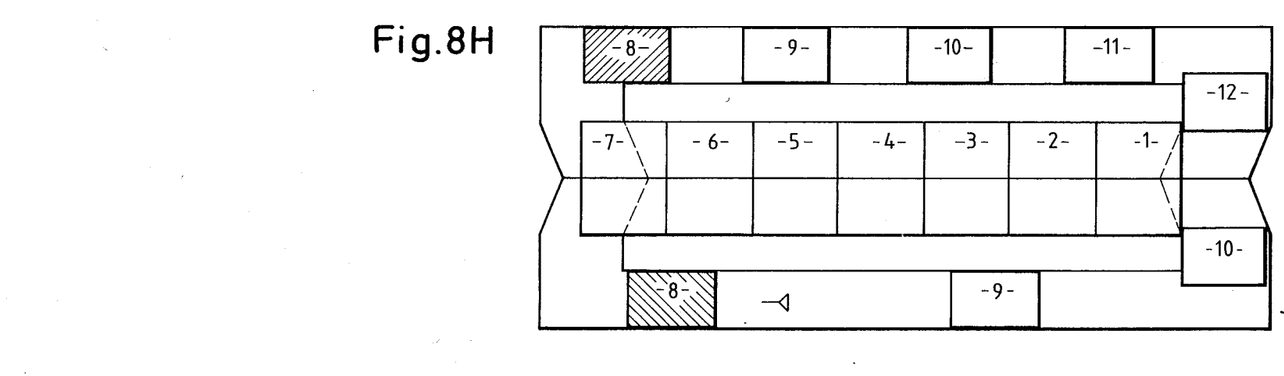

FIGS. 8A to 8I show in more detail the working cycle for these two operating possibilities which when for example each mould half has a length of ½ m permits the production of different pipes of 5 m length and 6 m length (of course for example pipes of 3 m and 2.5 m length may also be made). In the upper half of the drawing in each case the operation with 12 mould halves in each sequence is shown and in the lower half the operation with 10 mould halves in each sequence. In these Figures the working direction is assumed to be from the right to the left, i.e. the start of the working section is on the right and the end thereof on the left. Proceeding from the state shown in FIG. 8A and considering the two mould halves bearing the number 8 in each case it is apparent that these are first moved apart by the transverse conveyors 7 whilst retaining the travelling speed of the hollow mould and then come into the waiting positions at the corresponding corners of the base plate 1 as shown in FIG. 8E. From here, after a very short waiting time of the order of magnitude of a fraction of a second (this is apparent from the fact that the distance between the mould half 8 and the mould half 9 in FIG. 8E is only slightly less than the distance between the mould halves 9 and 10) said mould halves are engaged by a driver of the corresponding return conveyor and conveyed back at a distance from the preceding mould half 9 corresponding to the pitch or division of said drivers. This cycle repeats itself synchronously at the end of the working section. If as shown in FIG. 8F the foremost mould half 12 or 10 in the return conveying direction has arrived in the waiting position at the start of the working section said mould half is immediately engaged by the corresponding transverse conveyor 15 and pushed to the start of the working section, as described already in detail above.

Since the conveying speeds of the transverse conveyors are rigidly coupled to the travelling speed of the hollow mould, as apparent from the foregoing when 12 mould halves instead of 10 mould halves are present in the sequence the return conveyor must convey back twice as many mould halves in unit time or to be more precise in a corresponding cycle of the hollow mould drive than when only 10 mould halves are present in the sequence, i.e. it must run twice as fast.

FIGS. 8A to 8I show the state of the travelling mould halves in each case substantially at equal intervals of time, i.e. the FIG. 8I is then again followed by the FIG. 8A.

We claim:

1. In apparatus for the continuous production of pipes with cross-profiled walls from a pipe strand of thermoplastic plastic emerging in still plastic state from an extrusion nozzle comprising two sequences, moving in endless paths, of mould halves which run adjacent each other along a straight working section following the extrusion nozzle and complement each other in pairs to form a travelling hollow mould for the profiling of the tube walls, and a return means which for each of said sequences at the end of the working section moves the arriving mould halves transversely of the working section apart into positions adjacent the end of the working section, then conveys the mould halves back to positions adjacent the start of the working section in a state not joined together within the sequence by means of return conveyors extending along the working section spaced from the latter and places them there again at the start of the hollow mould, and a plurality of mould halves of each sequence may be disposed simultaneously in the return conveyor, the sequences of mould halves circulating guided on a horizontal base and the return means having for each mould half sequence separate transverse conveyor means at the start and end of the working section to convey the mould halves for each of the sequences from the position adjacent the start of the working section to the start of the hollow mould and from the end of the hollow mould into the position adjacent, the end of the hollow mould, the improvement wherein the conveyors each comprise beneath the mould half path an endless pulling member having a run circulating in the conveying direction of the respective conveyor, that the pulling members carry drivers which at the start of the conveying path come into engagement with the mould halves entrain the latter and at the end of the conveying path come out of engagement with the mould halves again, that the mould halves in the region of the return means are moved in spaced relationship with each other, and that guide elements are provided for parallel guiding of the mould halves in the region of the return means.

2. In apparatus according to claim 1, the improvement further comprising waiting stations where mould halves are left standing by the transverse conveyor means or the return conveyor before they are engaged short time thereafter by said transverse conveyor means or a said return conveyor for return to a position adjacent the start of said making section, the conveyor and the transverse conveyor means being such as to permit the molds to accumulate briefly in the waiting stations.

3. In apparatus according to claims 1 or 2, the improvement further comprising the pulling members are chains.

4. In apparatus according to the improvement further comprising claim 1 the drivers of the transverse conveyors are strips which extend perpendicularly to the conveying direction thereof and which cooperate with correspondingly extending abutment faces of the mould halves and guide the latter during the transverse conveying path in their parallel position.

5. In apparatus according to the improvement further comprising claim 4, the drivers of the transverse conveyors at the ends of the working section cooperate with the flanks of grooves provided on the lower sides of the mould halves and the drivers of the transverse conveyors at the beginning of the working section cooperate with the surfaces of the mould halves remote from the hollow mould.

6. In apparatus according to the improvement further comprising claim 4 the drivers of at least the transverse conveyors are secured to their pulling members in resiliently yielding manner in the conveying direction.

7. In apparatus according to the improvement further comprising claim 1 the mould halves in the region of the return conveyors are guided at ribs of the base extending in the conveying direction.

8. In apparatus according to the improvement further comprising claim 1 at the end of the conveying path in each case except for the start of the hollow mould positioning stops for the mould halves are provided.

9. In apparatus according to the improvement further comprising claim 1 the mould halves of each sequence at their end faces engaging in the working section on the leading and trailing mould half comprise interfitting complementarily shaped transverse ribs or grooves which guide the mould halves of each sequence during the pushing together at the start of the working section on the hollow mould guided rigidly in said working section.

10. In apparatus according to the improvement further comprising claim 5 the four transverse conveyors are made identically, that the transverse conveyors at the start of the working section lie further remote laterally from the working section than the transverse conveyors at the end of the working section by an amount corresponding to the distance of the grooves at the lower side of the mould halves from the side faces of the mould halves remote from the hollow mould, that the return conveyors engaging the leading, in the working direction, end faces of the mould halves with their drivers are arranged a smaller lateral distance from the working section than the deflection wheels of the transverse conveyors remote from the working section at the start of the latter, that the start of the return conveyors lying in each case at the end of the working section is remoter from the associated transverse conveyor at the start of the working section than the transverse conveyor at the end of the working section and that the latter conveyor lies between the working section and the associated return conveyor.

11. In apparatus according to claim 1 the improvement wherein the hollow mould is driven by at least one gear shaft which is disposed at the start of the working section and cooperates with a toothed means at the lower side of the mould halves and that the toothed means of the mould halves via a gear arrangement at the end of the working section drives the transverse conveyors disposed there.

12. In apparatus according to claim 11 the improvement wherein said gear arrangement further comprises means for operating the return means such as to receive and transport varying numbers of mold halves.

13. Apparatus according to claim 12, the improvement further comprising means for adjusting the ratio of the circulating speed of the return conveyors to that of the transverse conveyors and that the drivers of the return conveyor can be secured in different numbers and different intervals on the pulling member thereof or mounted on the pulling members at intervals corresponding to different numbers of mould halves.

14. Apparatus according to claim 12 or 13, the improvement wherein said gear arrangement further comprises a gear shaft disposed at the start of the working section and cooperating with a toothed means on the lower side of the mould halves and that a shift gear driven jointly and synchronously with the gear shaft drives the pulling members of the return conveyors with selectable speed whilst the transverse conveyors are driven with invariable transmission ratio with respect to the gear shaft.

* * * * *